United States Patent
Tsao

(10) Patent No.: US 6,652,085 B2
(45) Date of Patent: Nov. 25, 2003

(54) ENHANCEMENT OF WATERFASTNESS USING A POLYAMINE/ANIONIC DYE MIXTURE WITH AN ACIDIC FIXER

(75) Inventor: Yi-Hua Tsao, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 10/002,065

(22) Filed: Oct. 30, 2001

(65) Prior Publication Data

US 2003/0082350 A1 May 1, 2003

(51) Int. Cl.$^7$ .................................................. B41J 2/01
(52) U.S. Cl. ........................ 347/100; 347/96; 106/31.13
(58) Field of Search ........................ 347/100, 96, 101, 347/97; 106/31.13, 31.6, 31.27, 31.26

(56) References Cited

U.S. PATENT DOCUMENTS

| | | |
|---|---|---|
| 5,549,740 A | 8/1996 | Takahashi et al. |
| 5,624,484 A | 4/1997 | Takashishi et al. |
| 5,723,179 A | 3/1998 | Wong et al. |
| 6,074,052 A | 6/2000 | Inui et al. |
| 6,102,537 A | 8/2000 | Kato et al. |
| 6,270,214 B1 * | 8/2001 | Smith et al. ............... 347/101 |
| 6,281,269 B1 * | 8/2001 | Schut ........................ 347/100 |
| 6,450,632 B1 * | 9/2002 | Tsang et al. ............... 347/100 |
| 6,498,222 B1 * | 12/2002 | Kitamura et al. .......... 347/100 |

FOREIGN PATENT DOCUMENTS

| | | | | |
|---|---|---|---|---|
| EP | 0926212 | | 6/1999 | |
| EP | 1099731 | | 5/2001 | |
| JP | 1009279 | * | 1/1989 | ........... C09D/11/00 |
| JP | 08025801 | | 1/1996 | |

* cited by examiner

Primary Examiner—Stephen D. Meier
Assistant Examiner—Manish Shah

(57) ABSTRACT

A system for printing images with improved waterfastness, and methods for printing an image having improved waterfastness are disclosed. The system comprises a first pen containing an ink composition, wherein the ink composition comprises effective amounts of an anionic dye, a polyamine, and an ink vehicle; a second pen containing an acidic fixer composition, wherein the acidic fixer composition comprises an effective amount of an acid and an ink-vehicle. The first pen and the second pen are configured to print the ink composition and the acidic fixer composition, respectively, onto a substrate such that the ink composition and the acidic fixer composition are in contact on the substrate. The amount of acid fixer utilized can be sufficient to protonate substantially all of the polyamines while not protonating the anionic dye, though a lesser or greater amount can also be used with success.

18 Claims, No Drawings

ENHANCEMENT OF WATERFASTNESS USING A POLYAMINE/ANIONIC DYE MIXTURE WITH AN ACIDIC FIXER

FIELD OF THE INVENTION

The present invention relates generally to ink-jet inks, systems, and methods for improving the waterfastness of printed images.

BACKGROUND OF THE INVENTION

Thermal ink jet printers, provide an effective means of propelling ink jet inks onto various media including paper. These printers can accomplish this by using resistive heater elements for heating the ink to a boil, and propelling the ink through an overlying orifice plate. Such printers, as typified by the Hewlett-Packard DeskJet™ and DesignJet™ printers, are desirable for use for several reasons. For example, thermal ink jet printers have a relatively fast throughput while being relatively inexpensive to run. Additionally, these printers are relatively easy to use, and the ink is easily replaced.

There are several reasons that ink-jet printing has become a popular way of recording images on various media surfaces, particularly paper. Some of these reasons include low printer noise, capability of high speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, new applications, etc. As new ink-jet inks are developed, there are several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Dye-based ink-jet inks have been a dominant technology in the ink-jet ink arena. However, as many dyes are water-soluble, images printed using many of such dye-based ink jet inks are not as waterfast as may be desirable. In the prior art, the waterfastness of an anionic dye-based ink-jet ink printed on media has been shown to be enhanced by overprinting or underprinting the printed image with a cationic polymer, such as from a separate pen. Thus, when the cationic polymer and the anionic dye contact one another on a substrate, a reaction between the dye and the polymer creates an image with improved waterfastness. However, despite this improvement, there is still a need in this area to provide additional ink-jet inks, systems, and methods for improving the waterfastness of ink-jet ink images.

SUMMARY OF THE INVENTION

It has now been discovered that the use of three key components can provide the means for improving waterfastness of printed images. Essentially, by printing images using an anionic dye, a polyamine compound, and an acidic fixer, images that exhibit desired waterfastness can be obtained. More particularly, in one embodiment, the anionic dye and the polyamine compound can be part of a single ink-jet ink formulation, as ink-jet inks having both of these components can remain stable at relatively high pH levels and have acceptable viscosity. For example, in some embodiments, a pH from about 9 to 11 and a viscosity from about 1 to 5 cp can be achieved with acceptable stability. Thus, a first pen formulation can comprise an anionic dye, a polyamine compound, and an ink vehicle. As part of a second pen formulation, an acidic fixer composition can comprise an ink vehicle and an acid. Thus, when the composition of the first pen and the composition of the second pen are both printed onto a substrate such that the first pen composition contacts the second pen composition, protonation of the polyamine can occur resulting in ink precipitation or fixation. This system results in improved waterfastness.

In a first aspect of the present invention, a system for printing images with improved waterfastness is disclosed. The system can comprise a first pen containing an ink composition and a second pen containing an acidic fixer composition. The ink composition preferably comprises effective amounts of an anionic dye, a polyamine, and an ink vehicle. The acidic fixer composition comprises an effective amount of an acid and an ink-vehicle. With this system, the first pen and the second pen are configured to print the ink composition and the acidic fixer composition, respectively, onto a substrate such that the ink composition and the acidic fixer composition are in contact on the substrate. The acid of the acidic fixer composition acts to protonate the polyamine of the ink composition on the substrate. In one embodiment, the acid concentration and volume of the acidic fixer composition utilized can be sufficient to preferentially protonate the polyamine molecules on the substrate, and not protonate the anionic dye molecules.

In an alternative aspect of the present invention, a method of printing a waterfast image using an ink-jet printer is disclosed. This method comprises the steps of jetting an ink composition onto a substrate, wherein the ink composition comprises effective amounts of an ink vehicle, an anionic dye, and a polyamine; and jetting an acidic fixer composition onto the substrate, wherein the acidic fixer composition comprises an effective amount of an acid and an ink-vehicle. Thus, the acidic fixer composition can contact the ink composition on the substrate, providing the image having improved waterfastness.

In yet another aspect of the present invention, an ink-jet ink created image is disclosed comprising a substrate, having printed thereon, effective amounts of ink vehicle, an anionic dye, a polyamine, and an acid. The anionic dye provides color to the image, and the acid protonates the polyamine resulting in increased waterfastness.

DETAILED DESCRIPTION OF THE INVENTION

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "an ink" includes reference to one or more of such inks.

As used herein, "effective amount" refers to the minimal amount of a substance or agent, which is sufficient to achieve a desire effect. For example, an effective amount of an "ink vehicle" is the minimum amount required in order to create an ink composition or acidic fixer composition, while maintaining properties necessary for effective ink-jetting.

As used herein, "ink vehicle," refers to the vehicle in which the anionic dyes, polyamines, and/or acids are placed to form an ink. Ink vehicles are well known in the art, and a wide variety of ink vehicles may be used with the systems, methods, and ink composition of the present invention. Such ink vehicles may include a mixture of a variety of different agents, including without limitation, surfactants, solvents, co-solvents, buffers, biocides, viscosity modifiers, surface-active agents, and water.

An "ink composition" comprises in ink vehicle, an anionic dye, and a polyamine. Such a composition is stable at a relatively high pH. For example, in some embodiments, a pH from about 9 to 12 and a viscosity from about 1 to 5 cp can be achieved. The polyamine is primarily present for protonation in order to improve the waterfastness of a resulting image. The anionic dye is primarily present to provide color to the resulting image.

An "acidic fixer composition" comprises an ink vehicle and an acid. The acid acts to protonate a polyamine of the ink composition, thus providing improved waterfastness of a resulting image. Any functional acid can be used for the acid fixer composition, though acids such as succinic acid, glycolic acid, and/or citric acid are preferred.

With these definitions in mind, a waterfast ink-jet ink created image, as well as systems and methods for printing images with increased waterfastness are disclosed herein. Specifically, a system for printing images with improved waterfastness is disclosed, comprising a first pen containing an ink composition, wherein the ink composition comprises effective amounts of an anionic dye, a polyamine, and an ink vehicle; a second pen containing an acidic fixer composition, wherein the acidic fixer composition comprises an effective amount of an acid and an ink-vehicle, and wherein the first pen and the second pen are configured to print the ink composition and the acidic fixer composition, respectively, onto a substrate such that the ink composition and the acidic fixer composition are in contact on the substrate. Preferably, the contact occurs as the acidic fixer composition is overprinted on the ink composition, or vice versa, i.e., underprinted.

In another embodiment of the present invention, a method of printing a waterfast image using an inkjet printer is disclosed, comprising jetting an ink composition onto a substrate, wherein the ink composition comprises effective amounts of an ink vehicle, an anionic dye, and a polyamine; and jetting an acidic fixer composition onto the substrate, wherein the acidic fixer composition comprises an effective amount of an acid and an ink-vehicle, and wherein the acidic fixer composition contacts the ink composition on the substrate. Again, preferably, the contact occurs as the acidic fixer composition is overprinted on the ink composition, or vice versa.

Next, an ink-jet ink created image is disclosed, comprising a substrate, having printed thereon, effective amounts of ink vehicle, an anionic dye, a polyamine, and an acid, wherein the anionic dye provides color to the image, and wherein the acid protonates the polyamine resulting in increased waterfastness.

With each of the above disclosed embodiments, though not required, it is preferred that a plurality of the polyamine molecules of the ink composition be protonated. The reason that the acid of the acidic fixer composition will tend to protonate the polyamine before the anionic dye composition has to do with the pKa of the polyamine composition over the anionic dye. For example, if the polyamine has a pKa of about 9, and the anionic dye is anionic due to the presence of pendent sulfonic groups (much lower pKa), then substantially all of the polyamines will tend to be protonated exclusive of the anionic dye. If excess acid is used, then the anionic dye will be begin to become protonated. Though the invention allows for anionic dye protonation, it is preferred that the anionic dye not be protonated, as such occurrence would generally require the addition of a large amount of acid. Additionally, though it is preferred that a substantial portion of the polyamine molecules be protonated by the acid, this is not required. When fewer of the polyamine molecules are protonated, increased waterfastness is still observed.

Turning to the anionic dyes that can be used with the present invention, preferably the anionic dye is a chromaphore having a pendent anionic group. Though any effective amount of dye can be used, preferably, the anionic dye can be present in the ink composition at from 0.1% to 10% by weight. Examples of suitable anionic dyes include a large number of water-soluble acid and direct dyes. Specific examples of anionic dyes include Direct Yellow 86, Acid Red 249, Direct Blue 199, Direct Black 168, and Direct Yellow 132; Aminyl Brilliant Red F-B (Sumitomo Chemical Co.); the Duasyn line of "salt-free" dyes available from Hoechst, Direct Black 168, Reactive Black 31, Direct Yellow 157, Reactive Yellow 37, Acid Yellow 23, Reactive Red 180, Acid Red 52, Direct Blue 199, and Acid Blue 9; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Food Black 2, Catodirect Turquoise FBL Supra Conc. (Carolina Color and Chemical), Direct Blue 86, Intrabond Liquid Turquoise GLL (Crompton and Knowles), Reactive Red 4, Reactive Red 56, Levafix Brilliant Red E-4B (Mobay Chemical), Levafix Brilliant Red E-6BA (Mobay Chemical), Acid Red 92, Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Direct Yellow 86, Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; mixtures thereof, and the like. Examples of preferred dyes can include Pro-Jet 485 (a copper phthalocyanine), Magenta 377, or Direct Yellow 132. This list is intended to be merely exemplary, and should not be considered limiting.

With respect to the polyamine molecules, any polyamine that when protonated, acts to improve waterfastness of an ink composition can be used. Again, though any functional amount can be present in the ink composition (if included in the ink composition), from about 0.1% to 10% by weight is preferred. Further, the polyamines used in conjunction with the present invention can have a molecular weight from about 200 to 200,000, though any functional molecular weight can be used. Examples of preferred polyamines can include those selected from the group consisting of polyethyleneimine, polyvinylpyridine, polyvinylamine, polyallylamine, and combinations thereof.

Turning to effective acids that can be used in the acidic fixer composition, any acid functional to protonate a polyamine of the ink composition can be used. However, because the preferred embodiment of the present invention is to be used in conjunction with ink-jet ink pens, certain acids, though functional, would be less desirable for use. For example, though hydrochloric acid is functional for protonating a polyamine, it would be more likely damage an ink-jet pen over time, as well as provide characteristics that are not as reliable as succinic acid, for example. However, such an acid is still within the scope of the present invention. Keeping pen reliability in mind, preferred acids can include those such as succinic acid, glycolic acid, citric acid, and combinations thereof. Inorganic acids such as nitric acid, hydrochloric acid, phosphoric acid, and sulfuric acid, and combinations thereof can be used. Additionally, other organic acids such as polyacrylic acid, acetic acid, malonic acid, malic acid, maleic acid, ascorbic acid, glutaric acid, fumaric acid, tartaric acid, lactic acid, and combinations thereof can also be used. Preferably, in the acidic fixer composition, the acid or combination of acids can be present at from 1% to 10% by weight.

The systems, methods, and ink-jet ink formulations can be printed on any substrate that is desired. For example, the most practical application will be to print the images disclosed herein on paper. However, plastics can also act as the substrate, such as is the case with overhead clear plastic sheets.

It is to be noted that the use of the polyamine and the anionic dye in a single ink composition, and the use of an acid in a separate acidic fixer composition is merely presented by way of a preferred embodiment. One skilled in the art would recognize that these three components could be combined in other ways to effectuate a similar result. For example, one could actually use three separate pens where the anionic dye, the polyamine, and the acid are presented on the substrate separately. Other similar modifications would be apparent to those skilled in the art.

EXAMPLES

The following examples illustrate the preferred embodiments of the invention that are presently best known. However, other embodiments can be practiced that are also within the scope of the present invention.

Three different ink compositions (Examples 1–3) and one acidic fixer composition (Example 4) were prepared and tested in accordance with the principles of the present invention. The compositions and test results are described below.

Example 1

Cyan Ink-jet Ink Composition

A cyan ink-jet ink composition was prepared by admixing the following ingredients, each measured by weight percentage:

| | |
|---|---|
| 3.49% | Anionic copper phthalocyanine dye |
| 3.0% | LUPASOL FG (a polyethylenimine or PEI) |
| 11.8% | 2-pyrrolidinone |
| 5.9% | 1,5-pentanediol |
| 3.3% | tetraethylene glycol |
| 2.0% | TERGITOL 15-S-5 (an ethoxylated alcohol) |
| 70.51% | deionized water |

Example 2

Magenta Ink-jet Ink Composition

A magenta ink-jet ink composition was prepared by admixing the following ingredients, each measured by weight percentage:

| | |
|---|---|
| 2.99% | Magenta 377 |
| 3.0% | LUPASOL FG (a polyethylenimine or PEI) |
| 11.8% | 2-pyrrolidinone |
| 5.9% | 1,5-pentanediol |
| 3.3% | tetraethylene glycol |
| 2.0% | TERGITOL 15-S-5 (an ethoxylated alcohol) |
| 71.01% | deionized water |

Example 3

Yellow Ink-jet Ink Composition

A yellow inkjet ink composition was prepared by admixing the following ingredients, each measured by weight percentage:

| | |
|---|---|
| 3.42% | Direct Yellow 132 |
| 3.0% | LUPASOL FG (a polyethylenimine or PEI) |
| 11.8% | 2-pyrrolidinone |
| 5.9% | 1,5-pentanediol |
| 3.3% | tetraethylene glycol |
| 2.0% | TERGITOL 15-S-5 (an ethoxylated alcohol) |
| 70.58% | deionized water |

All of the above ink-jet inks (Examples 1–3) were stable at a pH of about 11, and exhibited viscosity values from about 3 to 5 cp.

Example 4

Acidic fixer composition

An acidic fixer composition was prepared by admixing the following ingredients, measured by weight percentage:

| | |
|---|---|
| 4.5% | succinic acid |
| 11.8% | 2-pyrrolidinone |
| 5.9% | 1,5-pentanediol |
| 3.3% | tetraethylene glycol |
| 2.0% | TERGITOL 15-S-5 (an ethoxylated alcohol) |
| 72.5% | deionized water |

The acidic fixer composition of this Example had a pH of about 2.6, and a viscosity value of about 2.7 cp.

Example 5

Water Drip Transfer

Waterfastness of bar images for each of the ink compositions of Examples 1–3 were tested against the ink compositions of Examples 1–3 having overprinted and underprinted the acidic fixer composition of Example 4. HP4800A pens were used to jet the acidic fixer composition and HP4801A pens were used to jet the ink compositions using an HP2000C printer. Both plain paper (Hammermil Fore DP and Cascade Offset) and coated paper (Kromekote and Lustro Laser) were tested. The bar images having no acidic fixer composition overprinted or underprinted therewith were printed at 32 picoliters/300 dpi pixel. The bar images having the acidic fixer composition overprinted or underprinted therewith used the same amount of ink composition (32 picoliters/300 dpi pixel), and about 64 picoliters/300 dpi pixel acidic fixer composition.

The water drip transfer test was conducted 24 hours after the samples were printed. First, the optical density of each bar image on each substrate was determined. Then, the paper was set at a 45° angle where about 250 μl of water was dropped onto each bar. The run-off was then tested on the substrates just below the printed bar. Inks having the best waterfastness included ink systems where the initial optical density was relatively high, and the water drop run-off optical density was relatively low. The results are shown below in the following tables:

TABLE 1

Water Drip Transfer (Plain Paper)

| Composition of image tested | Bar (OD) | Water Drip Transfer (OD) |
|---|---|---|
| Example 1 ink printed alone | 0.87 | 0.045 |
| Example 4 fixer underprinted beneath Example 1 ink | 0.68 | 0.040 |
| Example 4 fixer overprinted on Example 1 ink | 0.87 | 0.035 |
| Example 2 ink printed alone | 0.68 | 0.120 |
| Example 4 fixer underprinted beneath Example 2 ink | 0.67 | 0.040 |
| Example 4 fixer overprinted on Example 2 ink | 0.79 | 0.025 |
| Example 3 ink printed alone | 0.75 | 0.065 |
| Example 4 fixer underprinted beneath Example 3 ink | 0.63 | 0.030 |
| Example 4 fixer overprinted on Example 3 ink | 0.81 | 0.030 |

TABLE 2

Water Drip Transfer (Coated Paper)

| Composition of image tested | Bar (OD) | Water Drip Transfer (OD) |
|---|---|---|
| Example 1 ink printed alone | 0.78 | 0.060 |
| Example 4 fixer underprinted beneath Example 1 ink | 0.72 | 0.020 |
| Example 4 fixer overprinted on Example 1 ink | 0.82 | 0.015 |
| Example 2 ink printed alone | 0.64 | 0.110 |
| Example 4 fixer underprinted beneath Example 2 ink | 0.80 | 0.055 |
| Example 4 fixer overprinted on Example 2 ink | 0.58 | 0.035 |
| Example 3 ink printed alone | 0.59 | 0.080 |
| Example 4 fixer underprinted beneath Example 3 ink | 0.79 | 0.035 |
| Example 4 fixer overprinted on Example 3 ink | 0.58 | 0.065 |

As can be seen from Table 1 and Table 2 above, by both underprinting and overprinting the acidic fixer composition of Example 4 with the polyamine/anionic dye containing inks of Examples 1–3, improved waterfastness is achieved on both plain and coated paper. Particularly, the waterfastness of the ink composition of Example 1, when printed over or under the acidic fixer composition of Example 4, is improved. The ink compositions of Example 2 and Example 3 are more significantly improved as to waterfastness when printed with the acidic fixer composition described in Example 4. Thus, an ink-jet ink system that contains all of the primary colors can be implemented that exhibits improved waterfastness.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A system for printing images with improved waterfastness, comprising:
   (a) a first pen containing an ink composition, said ink composition comprising an effective amount of an anionic dye, a polyamine, and an ink vehicle;
   (b) a second pen containing an acidic fixer composition, said acidic fixer composition comprising an effective amount of an acid and an ink-vehicle,
   wherein said first pen and said second pen are configured to print the ink composition and the acidic fixer composition, respectively, onto a substrate such that the ink composition and the acidic fixer composition are in contact on the substrate.

2. A system as in claim 1 wherein the acid present in the second composition is sufficient to protonate a plurality of the polyamine molecules on the substrate, and substantially avoid protonating the anionic dye.

3. A system as in claim 1 wherein the anionic dye is a chromaphore having a pendent anionic group, and is present in the ink composition at from 0.1% to 10% by weight.

4. A system as in claim 1 wherein the polyamine is present in the ink composition at from 0.1% to 10% by weight.

5. A system as in claim 1 wherein the polyamine is selected from the group consisting of polyethyleneimine, polyvinylpyridine, polyvinylamine, polyallylamine, and combinations thereof.

6. A system as in claim 1 wherein the acid is present in the acidic fixer composition at from 1% to 10% by weight.

7. A system as in claim 1 wherein the acid is selected from the group consisting of succinic acid, glycolic acid, citric acid, and combinations thereof.

8. A system as in claim 1 wherein the first pen is configured to print the ink composition on the substrate, and the second pen is configured to overprint the acidic fixer composition on the ink composition.

9. A system as in claim 1 wherein the second pen is configured to print the acidic fixer composition on the substrate, and the first pen is configured to overprint the ink composition on the acidic fixer composition.

10. A method of printing a waterfast image using an ink-jet printer, comprising:

(a) jetting an ink composition onto a substrate, said ink composition comprising an effective amount of an ink vehicle, an anionic dye, and a polyamine;

(b) jetting an acidic fixer composition onto said substrate, said acidic fixer composition comprising an effective amount of an acid and an ink-vehicle, and wherein said acidic fixer composition contacts said ink composition on said substrate and protonates a plurality of the polyamines on the substrate while substantially avoiding protonating the anionic dye.

11. A method as in claim 10 wherein said acidic fixer composition is overprinted on said ink composition.

12. A method as in claim 10 wherein said ink composition is overprinted on said acidic fixer composition.

13. An ink-jet ink created image, comprising:

(a) a substrate;

having printed thereon, (b) effective amounts of ink vehicle, an anionic dye, a polyamine, and an acid, wherein the anionic dye provides color to the image, and wherein the acid protonates the polyamine resulting in increased waterfastness, said acid being overprinted or underprinted with respect to the anionic dye and the polyamine.

14. A waterfast image as in claim 13 wherein the substrate is paper.

15. A waterfast image as in claim 13 wherein the acid is present in an amount such that a plurality of the polyamine molecules are protonated, and substantially all of the anionic dye molecules are not protonated.

16. A waterfast image as in claim 13 wherein the anionic dye is a chromaphore having a pendent anionic group.

17. A waterfast image as in claim 13 wherein the polyamine is selected from the group consisting of polyethyleneimine, polyvinylpyridine, polyvinylamine, polyallylamine, and combinations thereof.

18. A waterfast image as in claim 13 wherein the acid is selected from the group consisting of succinic acid, glycolic acid, citric acid, and combinations thereof.

* * * * *